(12) United States Patent
Gandhi et al.

(10) Patent No.: US 10,893,554 B1
(45) Date of Patent: Jan. 12, 2021

(54) METHOD FOR INDICATING AVAILABILITY OF SAME SERVICE ON OTHER RADIO ACCESS SYSTEM

(71) Applicant: Cisco Technology, Inc., San Jose, CA (US)

(72) Inventors: Indermeet Singh Gandhi, Bangalore (IN); Vimal Srivastava, Bangalore (IN); Srinath Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/540,580

(22) Filed: Aug. 14, 2019

(51) Int. Cl.
*H04W 76/11* (2018.01)
*H04W 8/18* (2009.01)
*H04W 76/15* (2018.01)
*H04W 8/02* (2009.01)
*H04W 84/04* (2009.01)
*H04W 84/12* (2009.01)
*H04W 88/08* (2009.01)
*H04L 12/46* (2006.01)

(52) U.S. Cl.
CPC ......... *H04W 76/11* (2018.02); *H04L 12/4641* (2013.01); *H04W 8/02* (2013.01); *H04W 8/18* (2013.01); *H04W 76/15* (2018.02); *H04W 84/042* (2013.01); *H04W 84/12* (2013.01); *H04W 88/08* (2013.01)

(58) Field of Classification Search
CPC ....... H04W 76/11; H04W 8/02; H04W 76/15; H04W 8/18; H04W 88/08; H04W 84/042; H04W 84/12; H04L 12/4641
See application file for complete search history.

(56) References Cited

U.S. PATENT DOCUMENTS

| | | | |
|---|---|---|---|
| 10,064,098 B2 | 8/2018 | Kalapatapu et al. | |
| 2016/0330743 A1 | 11/2016 | Das et al. | |
| 2018/0007557 A1* | 1/2018 | Lee | H04W 4/70 |
| 2018/0035301 A1 | 2/2018 | Nama et al. | |
| 2018/0176981 A1* | 6/2018 | Baer | H04W 36/14 |
| 2018/0184297 A1 | 6/2018 | Mohamed et al. | |
| 2018/0295509 A1* | 10/2018 | Lee | H04W 80/10 |
| 2019/0053186 A1 | 2/2019 | Mueck | |
| 2019/0069187 A1 | 2/2019 | Ashrafi | |
| 2019/0141624 A1* | 5/2019 | Wong | H04W 8/183 |
| 2020/0008138 A1* | 1/2020 | Sasindran | H04W 48/18 |

* cited by examiner

*Primary Examiner* — Christopher P Grey
(74) *Attorney, Agent, or Firm* — Edell, Shapiro & Finnan, LLC (57) ABSTRACT

Methods are provided which indicate availability of the same service on a different access network. In these methods, the network controller generates an identifier for each of one or more services provided by a wireless local access network (WLAN). The identifier is associated with a particular service which is also provided by a private radio network. The network controller provides to an access point the identifier to be broadcast to one or more user devices of the WLAN to connect to the particular service via the private radio network. A mobility management entity receives a request from a user device to connect to the private network, where the request includes an identifier associated with a particular service provided to the user device in the WLAN and based on the identifier, the mobility management entity enables the particular service to be provided to the user device via the private radio network.

20 Claims, 9 Drawing Sheets

FIG.1

| SNo. | SSID | SERVICE-TOKEN | MAPPED PRIVATE LTE APN | WiFi SERVICE POLICIES | CBRS SERVICE POLICIES | DATA PLANE IDENTIFIERS |
|---|---|---|---|---|---|---|
| 1 | BLIZZARD | abx621c3 | blizzard.com | INTERNET, VOIP, SPECIAL SERVICES ACCESS | INTERNET, VOIP, SPECIAL SERVICES ACCESS | L2-VNID-1, L3-VNID-2 |
| 2 | BLIZZARD-LEGACY | mbx721c3 | blizzard-legacy.com | INTERNET, VOIP ACCESS | INTERNET, VOIP ACCESS | L2-VNID-2, L3-VNID-2 |
| 3 | GUEST | tbu625c3 | guest.com | INTERNET ACCESS | INTERNET ACCESS | L2-VNID-3, L3-VNID-3 |

METHOD FOR INDICATING AVAILABILITY OF SAME SERVICE ON OTHER RADIO ACCESS SYSTEM

TECHNICAL FIELD

The present disclosure relates to interworking between various wireless radio access systems/networks.

BACKGROUND

To handle increasing traffic from various user equipment (UE) devices in private networks, new access technologies are being developed and explored. In public places that host public events such as sports events and music concerts, a Wi-Fi® wireless local area network (WLAN) may become overloaded and services available via the Wi-Fi network degrade in quality. To offload the Wi-Fi network, other private radio networks such as private Long Term Evolution (LTE) networks are gaining popularity.

One type of a private LTE network is a Citizens Broadband Radio Service (CBRS) network. The Federal Communications Commission (FCC) in the United States allocated radio spectrum in the 3550-3700 megahertz (MHz) band (e.g., 3.5 gigahertz (GHz) band) to CBRS for shared wireless broadband use by enterprises under certain sharing regulations. Enterprises can use this CBRS spectrum to set up private LTE networks and allow access to consumers and Internet of Things (IoT) devices. Since there is a considerable industry interest in private LTE network access, many entities are looking at leveraging the lightly/semi-licensed bands of CBRS spectrum for building private LTE networks. Private LTE network deployments co-exist with an already deployed Wi-Fi network access.

DESCRIPTION OF EXAMPLE EMBODIMENTS

Overview

Briefly, methods for indicating an availability of the same service via another radio access network are provided. In these methods, a network controller generates an identifier for each of one or more services provided by a wireless local access network (WLAN). The identifier is associated with a particular service of the one or more services. This particular service is also provided by a private radio network. The network controller further provides, to an access point, the identifier to be broadcast to one or more user devices of the WLAN to connect to the particular service via the private radio network.

Additionally, methods for enabling the same service on another radio access network are provided. In these methods, a mobility management entity receives from an access point of a private radio network a request to connect a user device to the private radio network. The request includes an identifier that is associated with a particular service provided to the user device via a WLAN. The mobility management entity further enables, based on the identifier, the particular service to be provided to the user device via the private radio network.

Example Embodiments

Enterprises today provide access via various networks such as WLAN and private radio networks. Enterprises have further segmented the networks into various services such that access is enabled to each of those segmented services. The various services may include but is not limited to access to specific network resources, enforcement of specific set of policies such as access controls, authorization policies, Internet access, firewall rules, and so on.

The networks are segmented using identifiers. In the WLAN, each service is associated with a unique service set identifier (SSID). A user connected to an enterprise SSID or a "guest" SSID, for example, is aware of the services being provided by the Wi-Fi network for those SSID's. Similar service structuring is realized for the CBRS network using an Access Point Name (APN) and/or CBRS Network Identifier (NID).

As noted above, while the user connected to the Wi-Fi network may be aware of the services identified by the SSID and the treatment associated with each of those SSID's on the Wi-Fi network access, the Wi-Fi network and the user are not aware of the same or corresponding service being available on a private LTE network, such as a CBRS network. Similarly, the private LTE network and the user are not aware of the equivalent or corresponding service available on the Wi-Fi network.

In one or more example embodiments, when the user is attached to a Wi-Fi network having particular SSID, the user and the Wi-Fi network (i.e., Wi-Fi access point) are informed or notified of an availability of the same service through another radio access system, e.g., via CBRS. In one or more example embodiments, the user is provided with an option to switch to another radio access system to receive the same service. The user may want to switch to another radio access system to receive the same service when the signal strength of the network (the Wi-Fi network) is bad or when the Wi-Fi network is congested.

In an example embodiment, the user receives the Wi-Fi service for a particular SSID, in a telecommunication (TR) room 10, for example, which has bad service. Both the user and the Wi-Fi network are aware that the service quality is poor. In an example embodiment, the user and the Wi-Fi network are notified to consider the CBRS access system and an equivalent service identity that maps to the service or services associated with the particular SSID are provided to the Wi-Fi network and the user. One or more example embodiments provide a service that allows the user to quickly discover the service name associated with the particular SSID on the CBRS access system, and attach to it. This allows the user to attach to the best indoor network or outdoor network as opposed to just being anchored on the Wi-Fi network.

In an example embodiment, a common service identifier across two different access types of networks is provided. Further, there is provided an advertisement of the service names of identical services available through the other access technology (Wi-Fi/CBRS). The user is prompted to use a private LTE radio network by receiving the service name of that identical service available on the CBRS access network. One or more example embodiments allow and prompt the users to connect to the best radio access system (e.g., Wi-Fi or CBRS) and not just to be anchored on the Wi-Fi radio access system. Accordingly, the services available on the private LTE and Wi-Fi access systems are unified. An enterprise user attached to the Wi-Fi access system is notified about the availability of the same service through the private LTE network of the enterprise. Mapping mechanisms that map the service layers based on a third Generation Partnership Project (3GPP) APN and Wi-Fi SSID based layer 2 (L2)/layer 3 (L3) domains are provided.

While one or more example embodiments are described with reference to a Wi-Fi radio access system/network and the CBRS radio access system/network or a private LTE radio access system/network, one of ordinary skill in the art would readily appreciate that example embodiments are applicable to other radio access systems/networks now known or hereinafter developed.

Further, while one or more example embodiments are described with reference to a mapping of an identical service available via different access networks, one of ordinary skill in the art would readily appreciate that other mappings are possible, as applicable for a particular configuration. For example, the mapping may be between similar corresponding or closest corresponding services.

Figure 1:
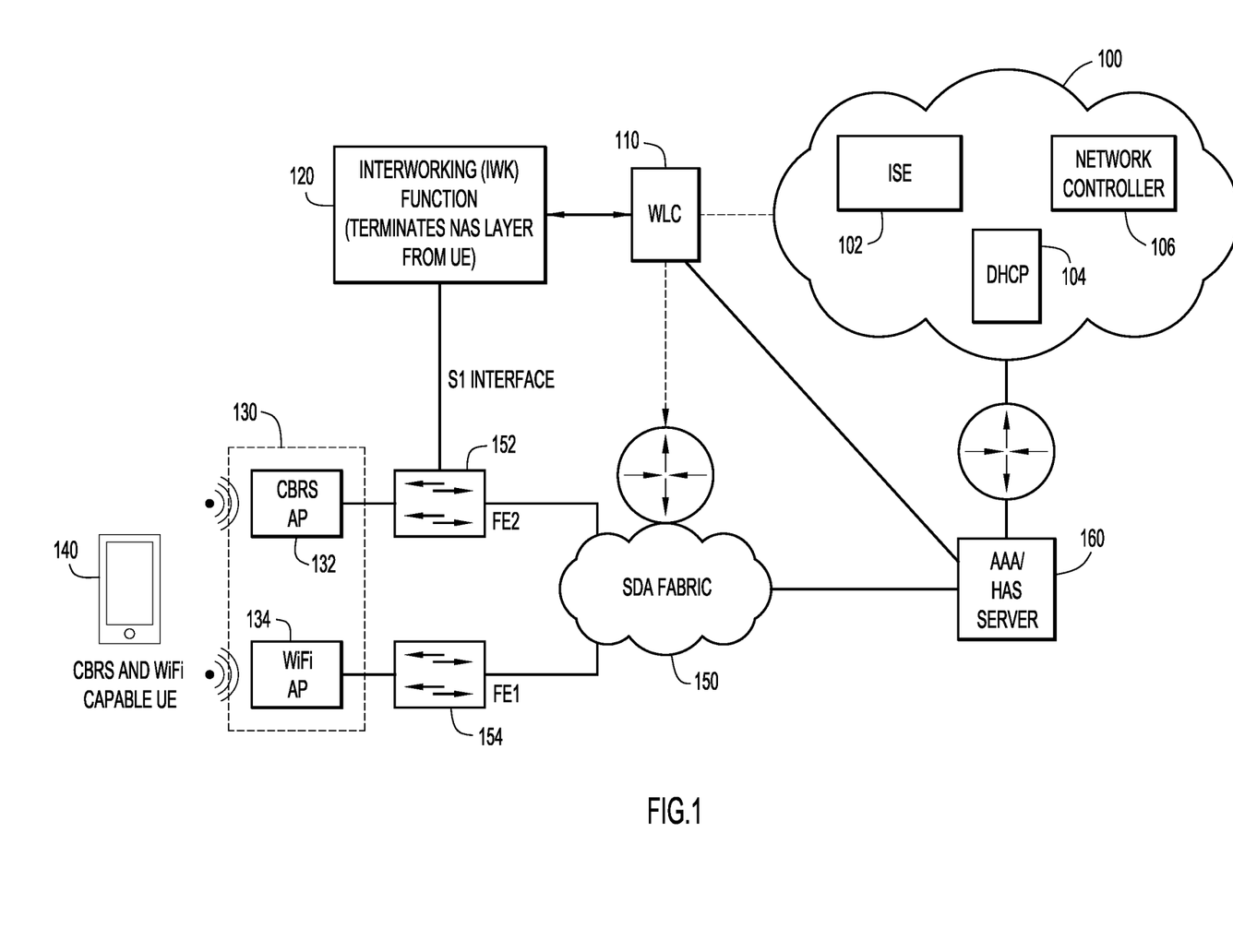
FIG. 1 is a block diagram of a network architecture indicating an availability of an identical service available on another radio access system, according to an example embodiment.

FIG. 1 is block diagram of a network architecture indicating an availability of an identical service available on another radio access system, according to an example embodiment. That is, FIG. 1 illustrates a network architecture for unifying the services available on private LTE and Wi-Fi network access systems, as an example.

As shown in FIG. 1, the network architecture includes an administrative domain 100, a wireless LAN controller (WLC) 110, interworking function (IWK) 120, an access point device (AP) 130, a user equipment device (UE) 140, software defined access (SDA) fabric 150, and an authentication, authorization, and accounting server (AAA) server and/or history accounting server (HAS) 160.

The administrative domain 100 is a maintained by a service security provider that holds security repositories and authenticates and authorizes clients with credentials. The administrative domain 100 generates security policies for a private network and/or groups of users. The administrative domain 100 includes a network of computers or a collection of networks and databases such as an identity services engine (ISE) 102, a Dynamic Host Configuration Protocol (DHCP) server 104, and a network controller 106. The identity services engine 102 enables the generation and enforcement of security and access policies for the endpoint devices (UEs) connected to company's routers and switches. The DHCP server 104 assigns dynamic IP addresses to devices on a network so that a UE can have a different IP address every time it connects to the network. The network controller 106 is the enforcer of the policies and controls access to the network. That is, the policies generated by the DHCP server 104 are enforced by the network controller 106 in cooperation with the AAA/HAS 160.

Also, policies and provisioning programmed in the administrative domain 100 are communicated to the WLC 110. The network controller 106 discovers and manages the WLC 110. The WLC 110 communicates via the SDA fabric 150 with the IWK 120 and one or more of the APs 130 based on these policies. That is, the wireless LAN controller 110 controls a number of APs 130 and propagates policies set for the administrative domain 100. The IWK 120 monitors events and works in cooperation with the wireless LAN controller 110 to control information including the policies to the AP 130. The IWK 120 is an example of a mobile management entity (MME). The AP 130 provides access to the UE 140. While only one UE 140 is shown in FIG. 1, one of ordinary skill in the art would readily appreciate that multiple UEs may be serviced by the same AP. The UEs may include smartphones, notepads, notebooks, and personal computers. In or more example embodiments, the UEs are Wi-Fi and CBRS enabled devices.

The AP 130 may include a CBRS AP 132 and a Wi-Fi AP 134. The CBRS AP 132 is connected to the SDA fabric 150 via a Forwarding Element (FE) 152 and the Wi-Fi AP 134 is connected to the SDA fabric 150 via the FE 154. This is provided by way of an example only and not by way of a limitation. One of ordinary skill in the art would readily appreciate that the CBRS AP 132 and the Wi-Fi AP 134 may be separate entities remote from each other. While FIG. 1 only depicts one AP 130, one of ordinary skill in the art would readily appreciate that multiple APs may exist in a network depending on a particular implementation or configuration.

In an example embodiment, the identifiers of the identical service provided via multiple access systems are mapped to one another in an administrative domain 100. For example, a network administrator configures the network controller 106 to map the Wi-Fi and CBRS private LTE service constructs. A Wi-Fi SSID is mapped with an APN in a private LTE network to achieve unified segmentation, service, and data plane policies.

Figure 2:
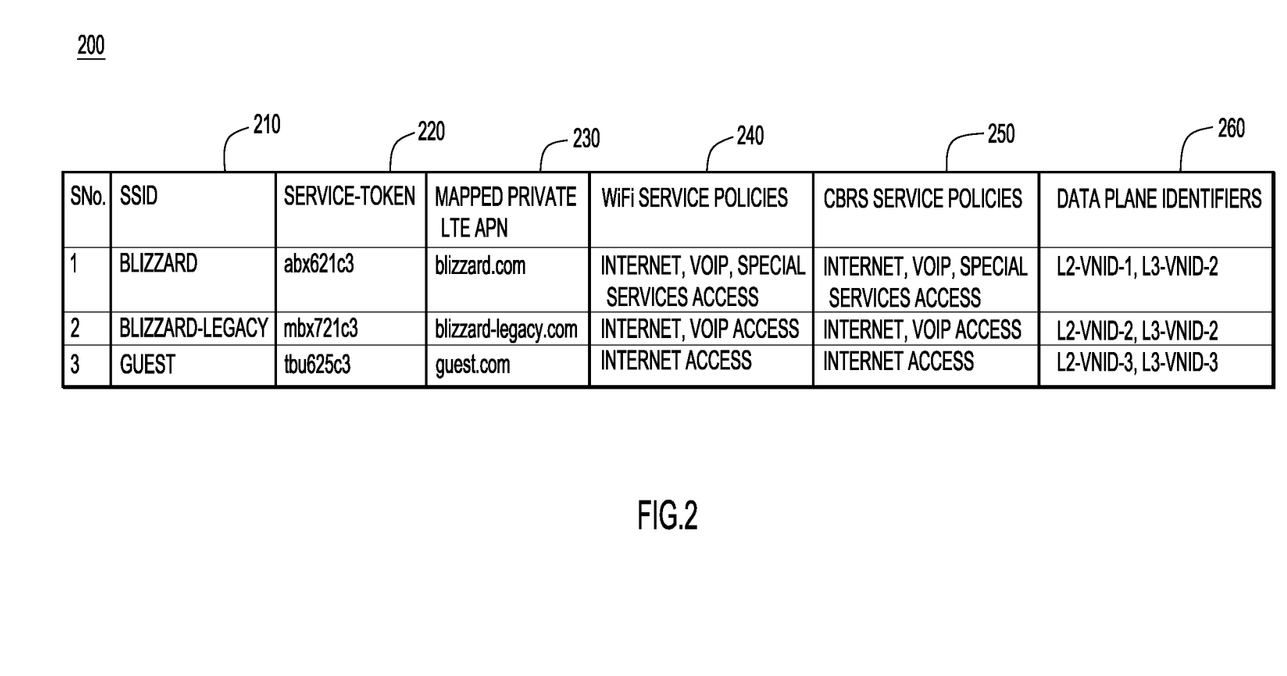
FIG. 2 illustrates a mapping table in which the same services are mapped to various radio access systems, according to an example embodiment.

FIG. 2 illustrates a mapping table 200 in which the same services are mapped across multiple radio access systems/networks, according to an example embodiment. The mapping table 200 shows 3 Services numbered 1, 2, and 3, a column for Wi-Fi SSID, a column for service-token (service-token column 220), a column for mapped private LTE APN, a column for Wi-Fi service policies 240, a column for CBRS service policies 250, and a column for data plane identifiers 260.

As shown in FIG. 2, a Wi-Fi SSID is mapped with the private LTE APN of a private radio network. For example, the SSID "blizzard" is mapped with an APN "blizzard.com". The SSID "blizzard-legacy" is mapped with the APN "blizzard-legacy.com" and the SSID "guest" is mapped with the APN "guest.com". In the mapping table 200, Wi-Fi service policies 240 corresponding to the respective SSID 210 in the Wi-Fi access network are mapped to the private LTE network APNs 230 that offer an equivalent service, identified as CBRS service policies 250. For example, for Service 1, the SSID "blizzard" is mapped with the APN "blizzard.com"; the Wi-Fi service policies are internet, voice over IP (VOIP), and special services access (e.g., emergency access); and the corresponding CBRS service policies are internet, VOIP, and the same special services access. In the mapping table 200, data plane identifiers 260 are provided for each of the Services. For example, for Service 1, the data plane identifiers are L2-virtual network identifier (VNID)-1 and L3-VNID-2. In an example embodiment, based on the mapping, the network controller 106 generates for each Service, a service token (shown in service-token column 220). As shown in the mapping table 200, Service 1 has a service token of "abx621c3", Service 2 has a service token of "mbx721c3", and Service 3 has a service token "tbu625c3". The service token may be a randomly generated number of alphanumeric characters. The service token is a predetermined number of bits, as explained in further detail below.

Referring back to FIG. 1, the network controller 106 configures the service token for each SSID on the Wi-Fi APs such as the Wi-Fi AP 134. Additionally, network controller 106 provides the allowed service token and, optionally, its corresponding APN mapping to the IWK 120 via the WLC 110.

The Wi-Fi AP 134 broadcasts the service token associated with each SSID in a beacon and/or probe responses using a vendor specific information element (IE). The service token is used in the CBRS (LTE) network to request an equivalent service identified via the APN while the UE 140 is accessing the CBRS network. In other words, when the UE 140, for example, detects poor quality of service on the Wi-Fi access network, the UE 140 transmits the service token to the CBRS AP 132 to request the same service via the CBRS access network.

The CBRS AP 132 uses the service token received in the request for access (an attach request) from the UE 140 to provide the same service with the same control policies. That is, using the service token, the CBRS AP 132 provides the same service that the UE 140 was receiving via the Wi-Fi network including similar segmentation and data plane policies identified via data plane identifiers 260 shown in the mapping table of FIG. 2.

The CBRS AP 132 communicates the service token received in the attach request to the IWK 120. The IWK 120 assigns an APN guaranteeing the UE 140 equivalent segmentation, service, and data plane policies.

Further, the AAA/HAS server 160 provides a security group tag (SGT) associated with the user identity to the WLC 110. The SGT and a security group access control list (SGACL) based on the user's group affiliation may be enforced in the data plane by the IWK 120. Thus, when the user uses the service token obtained in the Wi-Fi network, the user connects to a private radio (LTE) network and obtains exactly the same services including segmentation and data plane policies.

Figure 3A:
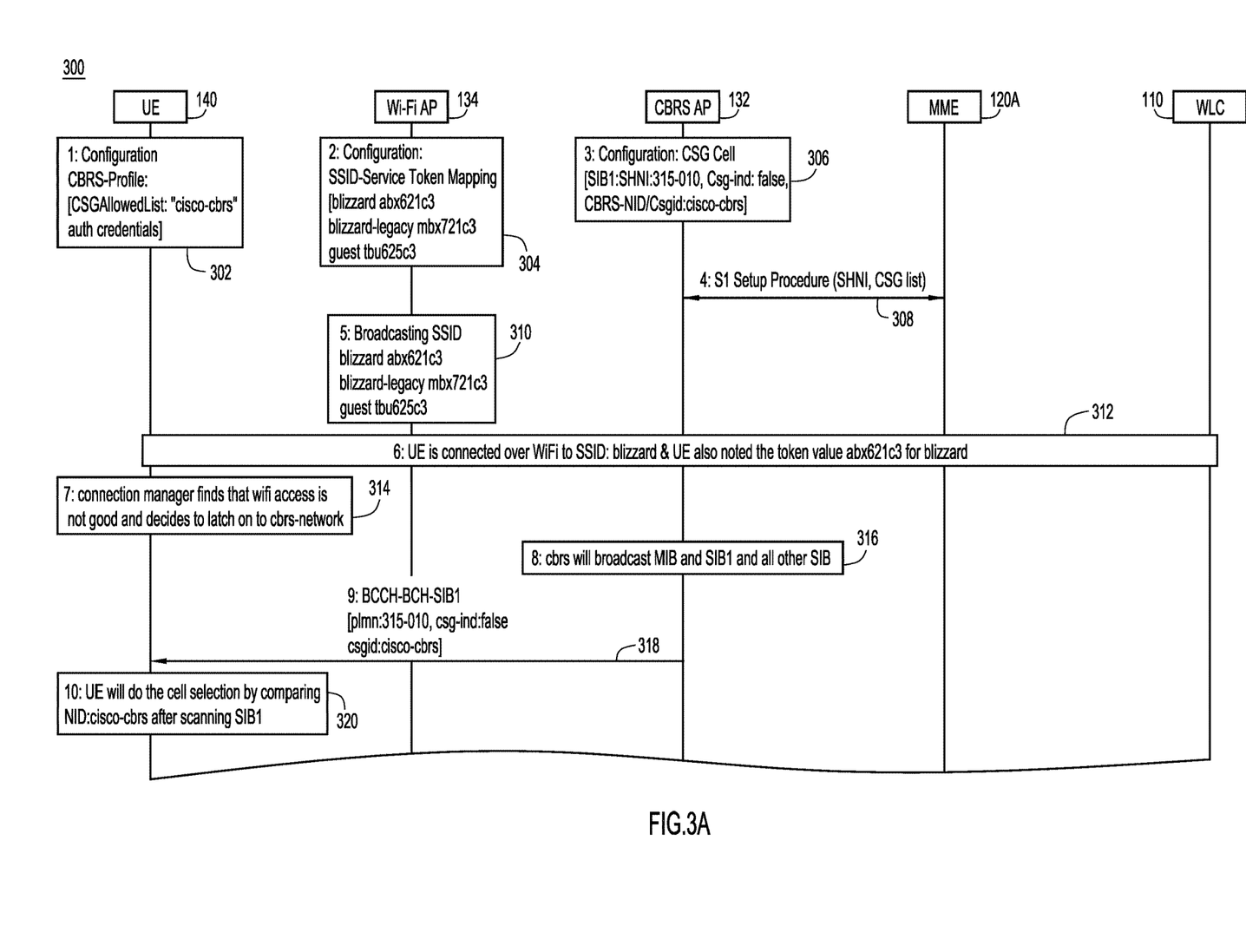
FIGS. 3A and 3B are sequence diagrams illustrating a method of mapping a service provided by a Wi-Fi network to the same service being provided by the CBRS network, according to an example embodiment.
Figure 3B:
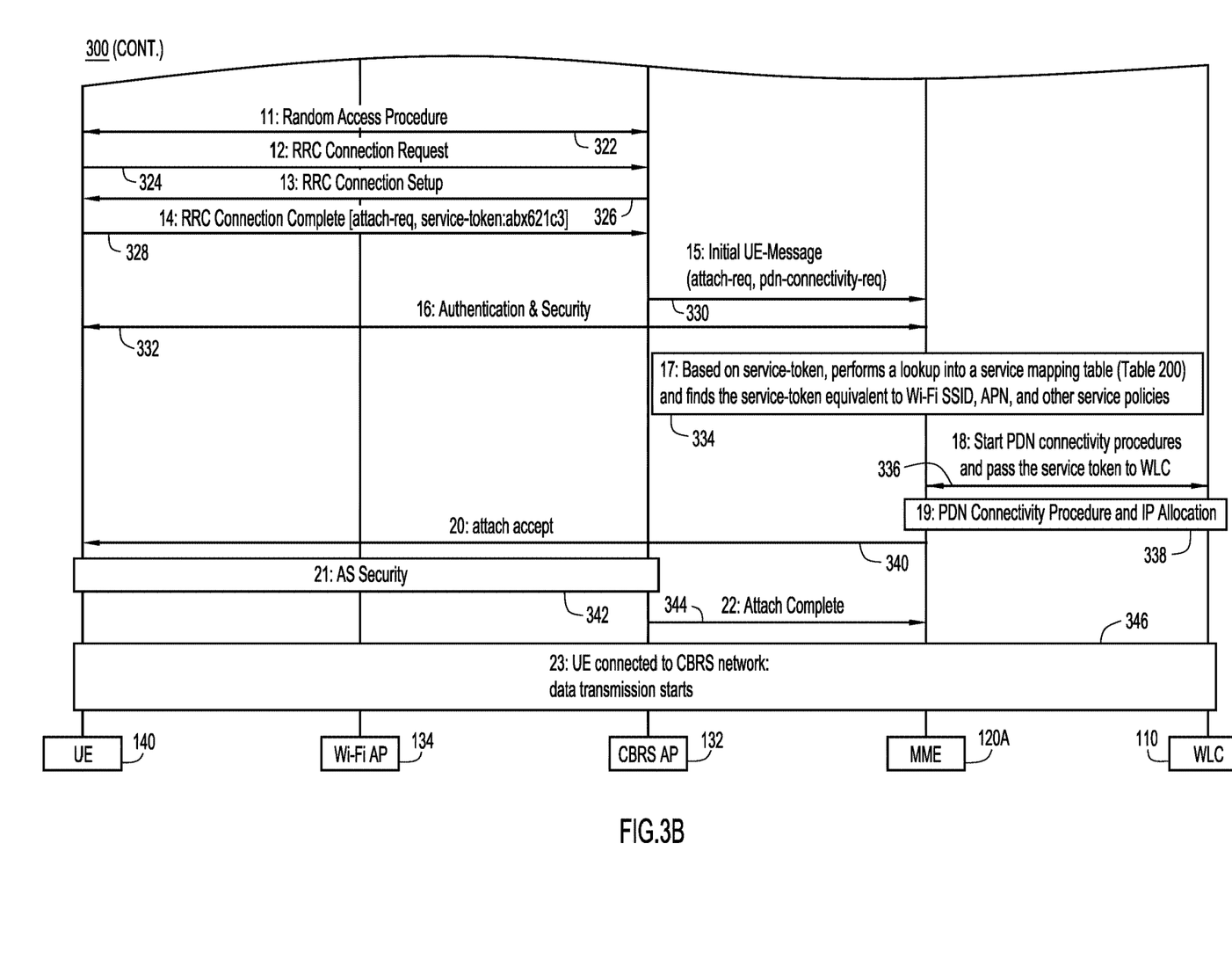

FIGS. 3A and 3B are sequence diagrams illustrating a method 300 of mapping a service provided by a Wi-Fi radio access system/network to the same service provided by the CBRS radio access system/network, according to an example embodiment. FIGS. 3A and 3B illustrate a seamless transition between two networks with similar segmentation and consistent access policies, according to an example embodiment.

In FIG. 3A, at 302, the UE 140 is configured to include a CBRS profile. The CBRS profile may include a closed security/subscriber group access (CSGA) allowed list that would include APNs that the UE 140 is authorized to access and corresponding user credentials. In an example embodiment, the CBRS profile includes APN "cisco-cbrs" and corresponding authorization credentials (auth credentials) provided to the UE 140 for access to the network.

At 304, the Wi-Fi AP 134 is configured to include SSID service token mapping. Specifically, the SSID "blizzard" is mapped to the service token "abx621c3", the SSID "blizzard legacy" is mapped to the service token "mbx721c3" and the SSID guest is mapped to the service token "tbu625c3", as shown in FIG. 2. That is, based on the mapping table generated by the network controller 106 (FIG. 1), the Wi-Fi AP 134 is provisioned to include the service token with the SSIDs it broadcasts. The service token may be a randomly generated number of a predetermined length. The length of the service token should be a predetermined number of bits such as 1 byte or 2 bytes depending on a particular implementation and the size of the vendor specific information element in the beacon frame or probe responses.

At 306, the CBRS AP 132 is configured to include a closed subscriber group (CSG) indicator such as "system information block type 1 (SIB1), shared home network identifier (SHNI): 315.010, Csg-ind: false, CBRS-NID Csgid:cisco-cbrs".

At 308, the CBRS AP 132 communicates with the MME 120A. Examples of the MME 120A may include an interworking function (IWF) or the IWK 120 shown in FIG. 1. The MME 120A manages handover signaling and network connection signaling. At 308, CBRS AP 132 performs S1 signaling with the MME 120A to provide the SHNI and the CSG list. The MME 120A performs control plane functions. Additionally, in an example embodiment, additional protocol communications are defined for the MME 120A to communicate with the WLC 110, as detailed below.

At 310, the Wi-Fi AP 134 broadcasts the SSID with a corresponding service token to one or more user devices, such as the UE 140. At 312, the UE 140 is connected over the Wi-Fi network to SSID "blizzard" and the UE 140 also notes the corresponding service token value "abx621c3". At 314, a connection manager within the UE 140 determines that the Wi-Fi access is not good or detects a poor network signal and decides to latch on to the CBRS radio access system/network.

At 316, the CBRS AP 132 is broadcasting information including, for example, a master information block (MIB) and SIB1 and all other SIBs available via the CBRS network. At 318, the broadcast information is provided to the UE 140 via broadcast control channel (BCCH)-broadcasting channel (BCH), the downlink-SIB1. The information provided includes a Public Land Mobile Network (PLMN) identifier: 315-010, Closed Secure Group (CSG) indicator (ind): false, CSG identifier (csgid: cisco-cbrs). That is, the CBRS AP 132 may broadcast radio resource control (RRC) configuration signaling to the UE 140. The RRC signaling may include, but not limited to, one or more of broadcasting system information, paging, establishment and/or release of an RRC connection, transferring non-access stratum (NAS) information, access stratum (AS) security configuration, transferring UE's radio access capability, measurement configuration and reporting, or mobility control. System information, as noted above, may include a number of information blocks, a MIB, and one or more SIBs. System information may also be used to communicate one or more parameters. For example, one or more SIBs may include a parameter that may identify the PLMN, e.g., "plmn: 315.010".

At 320, the UE 140 will do or perform a cell selection by comparing network identifier (NID): "cisco-cbrs" after scanning SIB1. That is, the UE 140 executes a network discovery procedure in which it processes information received from the CBRS AP 132 including scanning the MIB and the SIB1 and all other SIBs.

The method 300 of mapping a service provided by a Wi-Fi radio access system/network to the same service provided by the CBRS radio access system/network, according to an example embodiment, is continued with FIG. 3B (300 cont.). FIG. 3B illustrates that the UE 140 may then perform an attachment procedure to the CBRS AP 132 based on the configuration described above at 302.

In FIG. 3B, the attachment procedure includes a random access procedure at 322 and a RRC connection procedure at 324-328. That is, the UE 140 may schedule and/or set up a random access channel (RACH), at the 322. The UE 140 may then establish an RRC connection with the CBRS AP 132 by transmitting an RRC connection request at 324, and receiving from the CBRS AP 132 an RRC connection setup which may include an internet protocol (IP) address, at 326. The UE 140 may then transmit a message indicating that the RRC connection is complete, at 328. The RRC connection is complete message includes an attach request from the UE 140 and the service token "abx621c3".

At 330, the CBRS AP 132 may send an initial UE-message which includes an attach request (attach-req) and/or a Packet Data Network (PDN) connectivity request (pdn-connectivity-req) to the MME 120A. In an example embodiment, the initial UE-message also includes the service token provided by the UE 140, at 328.

At 332, the MME 120A communicates, via the CBRS AP 132, with the UE 140 and (an AAA/HAS server, not shown in FIG. 3) to authenticate the UE 140. The MME 120A authenticates the UE 140 and determines whether the UE 140 has any required permissions to access the CBRS network.

Provided the UE 140 is successfully authenticated at 332, the MME 120A performs a lookup processing to determine a corresponding service in the CBRS network, at 334. That is, the MME 120A, based on the service token provided at 330, performs a lookup into a service mapping table such as the one shown with reference to FIG. 2. The MME 120A is configured to store or access the mapping table generated by the network controller 106 (FIG. 1) to configure or select the CBRS network access to be provided to the UE 140. That is, based on the lookup, the MME 120A finds or locates the service token equivalent to the Wi-Fi SSID, APN, and other service policies. In other words, based on the service token, the MME 120A determines a corresponding CBRS service and associated service policies.

At 336, the MME 120A starts a PDN connectivity procedure and passes the token to the WLC 110. As an alternative, at 336, the MME 120A can provide an identifier of the determined CBRS service that corresponds to the service token to the WLC 110.

At 338, the WLC 110 performs a PDN connectivity procedure and IP address allocation based on the provided token among other provided parameters. At 340, the MME 120A communicates, via the CBRS AP 132, a message to the UE 140 indicating that the attach request has been accepted. At 342, the UE 140 and the CBRS AP 132 engage in access stratum (AS) security. At 344, the CBRS AP 132 transmits an attachment complete message to the MME 120A and at 346, the UE 140 is connected to the CBRS network so that data can be transmitted to and from the data network, such as the internet (not shown), and the UE 140 (data transmission starts). Accordingly, Wi-Fi SSID mapping to the CBRS network is provided via the MME 120A utilizing a newly defined service token. In one or more example embodiments, the user moves seamlessly between the Wi-Fi network and the CBRS network with similar segmentation and consistent access policies (VXLAN ID, SGT, SGACLs).

Figure 4A:
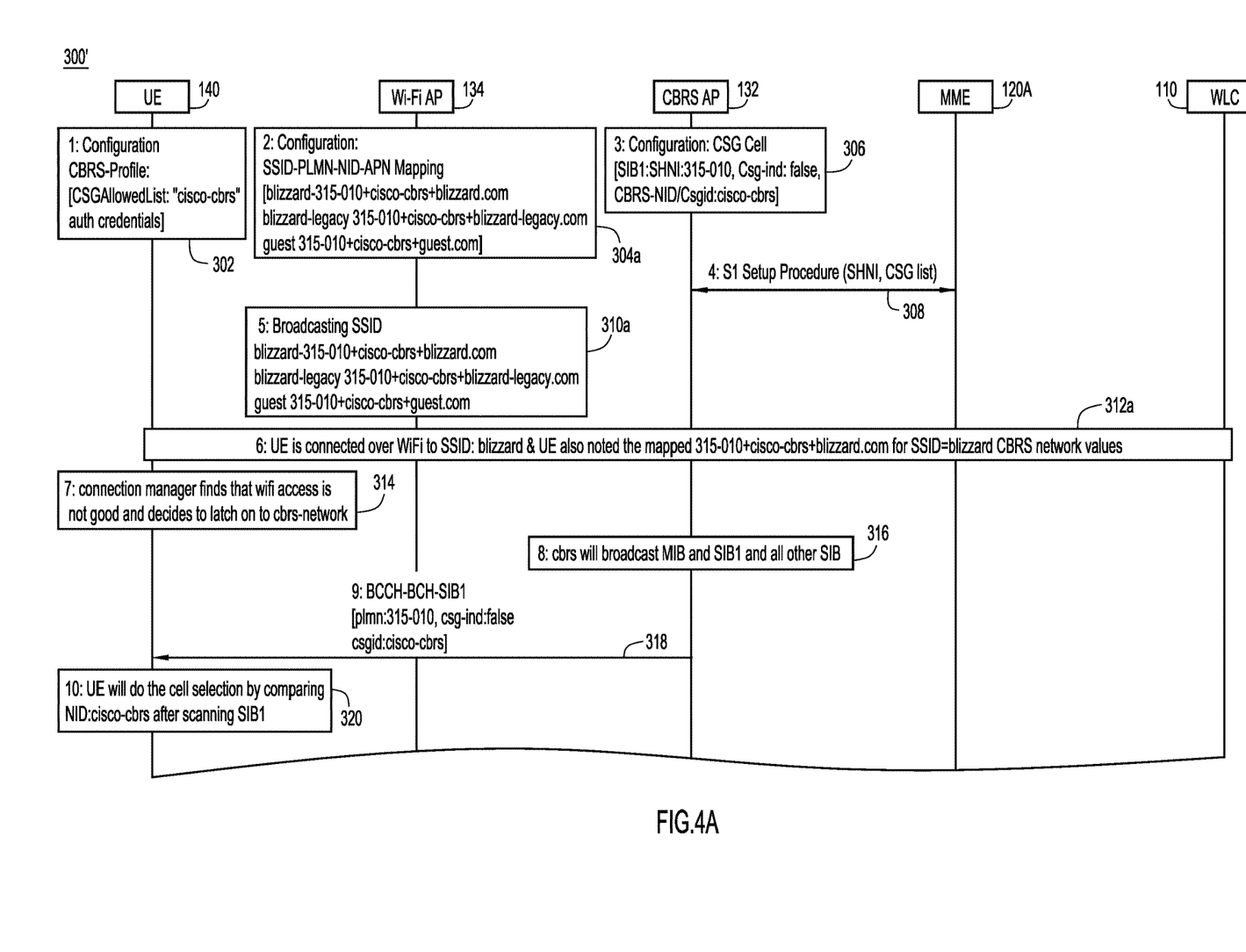
FIGS. 4A and 4B are sequence diagrams illustrating a method of mapping a service provided by Wi-Fi network to the same service provided by the CBRS network, according to another example embodiment.
Figure 4B:
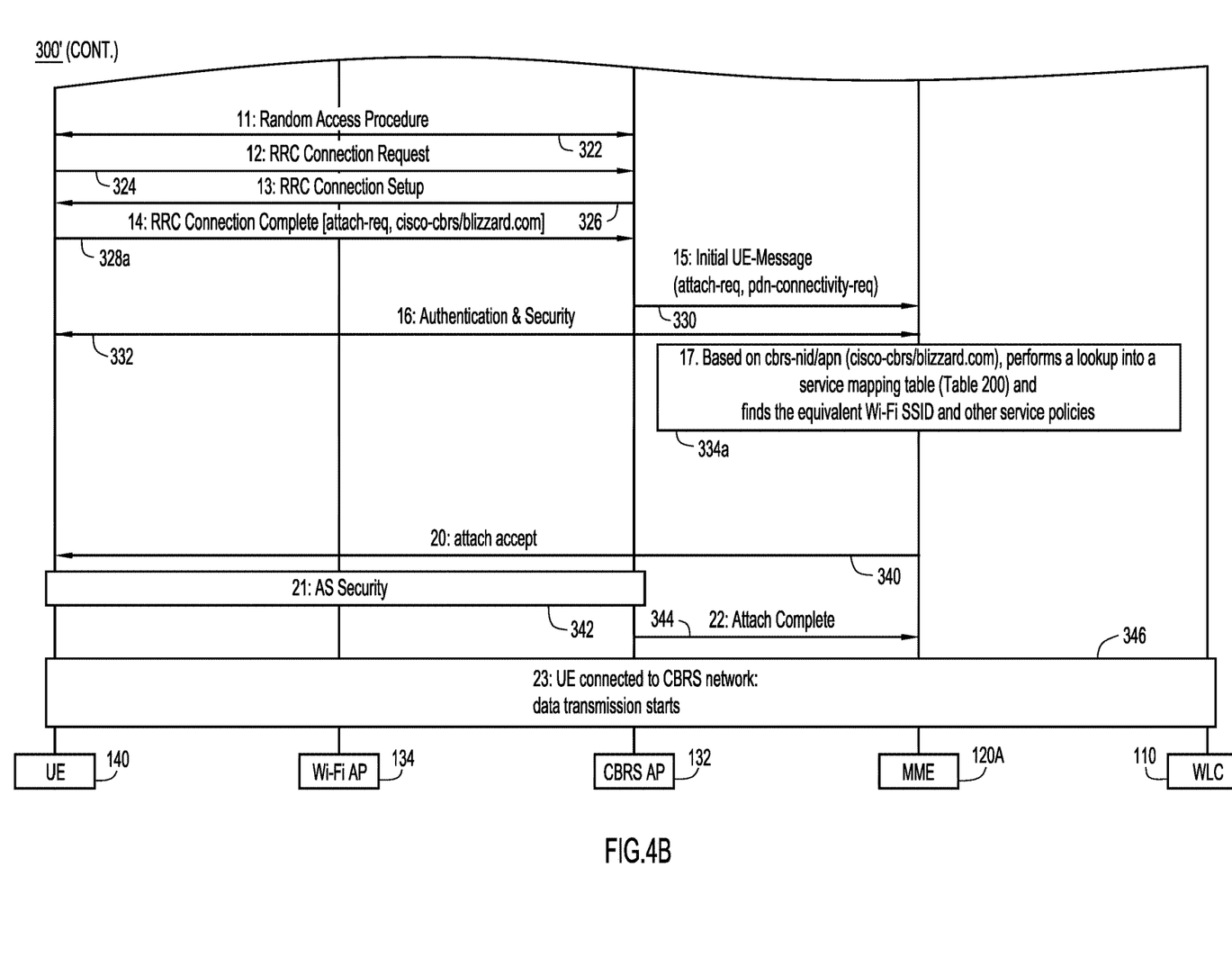

FIGS. 4A and 4B are sequence diagrams illustrating a method 300' of mapping a service provided by Wi-Fi network to the same service provided by the CBRS network, according to another example embodiment. In this embodiment, Wi-Fi SSID service construct may be mapped with individual CBRS-NIDs instead of a service token. This involves an enterprise or business to obtain multiple CBRS-NIDs from the CBRS alliance (for each of the SSIDs) and further involves broadcasting CBRS-NIDs in SIB1 using multiple SIBs broadcasts, each through logical CBRS APs. In still another embodiment, the SSID is correlated with the same service in the CBRS access network using a PLMN-NID-APN mapping instead of using a service token. Some operations in FIGS. 4A and 4B are analogous to the operations shown in FIGS. 3A and 3B. For the sake of brevity, a description of these operations is not provided in the description of FIGS. 4A and 4B. These operations are defined with the same numeric reference as the ones in FIGS. 3A and 3B.

As shown in FIG. 4A, at 304*a*, the Wi-Fi AP 134 is configured with an SSID that is mapped to a PLMN-NID-APN identifier. For example, the SSID "blizzard" is mapped to the PLMN-NID "315.010-cicso.cbrs" and the APN "blizzard.com", the SSID "blizzard-legacy" is mapped to a PLMN-NID "315.010-cicso.cbrs" and the APN "blizzard-legacy.com", and the SSID "guest" is mapped to a PLMN-NID "315.010-cicso.cbrs" and the APN "guest.com". In other words, in another example embodiment, instead of mapping the SSID to a service token, the SSID is directly mapped to a PLMN-NID and APN such that a combination of PLMN+NID+APN is broadcast to UEs instead of the service token. The network controller 106 (FIG. 1) generates a mapping table in which PLMN-NID and APN are mapped to the SSID instead of to the service token. The rest of the setup procedure (operations 306 and 308) is consistent with the description above with reference to FIG. 3A.

At 310*a*, however, the Wi-Fi AP 134 broadcasts the SSID with the PLMN+NID+APN. For example, the Wi-Fi AP 134 broadcasts "blizzard 315-010+cisco.cbrs+blizzard.com". Similarly, the Wi-Fi AP 134 broadcasts "blizzard-legacy 315-010+cisco-cbrs+blizzard-legacy.com" and "guest 315-010+cisco-cbrs+guest.com". At 312*a*, the UE 140 is connected over the Wi-Fi network to SSID "blizzard" and the UE 140 also notes the corresponding mapping of the PLMN-NID-APN "315-010+cisco=cbrs+blizzard.com". Operations 312-320 are the same as described above with reference to FIG. 3A.

Turning to the FIG. 4B, operations 322-326 are the same as described above with reference to FIG. 3B. Next, in FIG. 4B, at 328*a*, when the RRC connection is complete, the UE 140 transmits a message indicating that the RRC connection is complete. The message includes an attach request and the NID-APN "cisco-cbrs/blizzard.com". Operations 330 and 332 proceed as described above with reference to FIG. 3B except that in operation 330 the attach request includes the NID-APN instead of the service token. Provided the UE 140 is successfully authenticated at 332, the MME 120A performs a lookup processing to determine a corresponding service in the CBRS network, at 334*a*. In another embodiment, the MME 120A, based on the CBRS-NID/APN ("cisco-cbrs/blizzard.com") obtained at 330, performs a lookup into a service mapping table in which the SSID is mapped with the PLMN-NID-APN. The MME 120A is configured to access the mapping table generated by the network controller 106 (FIG. 1) to configure or select the CBRS network access to be provided to the UE 140. That is, based on the lookup, the MME 120A finds or locates an equivalent Wi-Fi SSID and other service policies. In other words, based on the CBRS identifiers (PLMN-NID-APN), the MME 120A determines corresponding Wi-Fi SSID to determine services and service policies to be provided in the CBRS. In one embodiment, operations 336 and 338 may be omitted and operations 340-346 are similar to that described above with reference to FIG. 3B.

As another embodiment or an additional variation, the reverse service mapping from the private radio (LTE) network to the Wi-Fi network is provided and may be achieved through SIB17 signaling. In other words, the UE receiving services via the private radio (LTE) network is provided with a service token that identifies an identical service available via the Wi-Fi access network. Accordingly, for example, when network conditions occur such that quality of signal or service degrades on the private radio (LTE) network, the UE may switch to the Wi-Fi network.

In example embodiments, a method for unifying the services available on the private radio (LTE) network and the Wi-Fi network are provided. An enterprise UE attached to the Wi-Fi network will be notified about the availability of the same service through the private radio (LTE) network. As explained above, mechanisms are provided for mapping the service layers which are defined based on 3GPP APN and Wi-Fi SSID based L2/L3 domains.

In example embodiments, the same services provided by various radio networks are mapped to each other using a mapping table generated by the network controller 106. The mapping table generated by the network controller 106 is propagated to configure the Wi-Fi AP 134 and the MME 120A. Additionally, according to various example embodiments, the mapping table generated by the network controller 106 may be propagated to the WLC 110 (FIG. 3) and/or to the CBRS AP 132 (in the case of the example embodiment of the reverse service mapping from the private LTE network to the Wi-Fi network).

Figure 5:
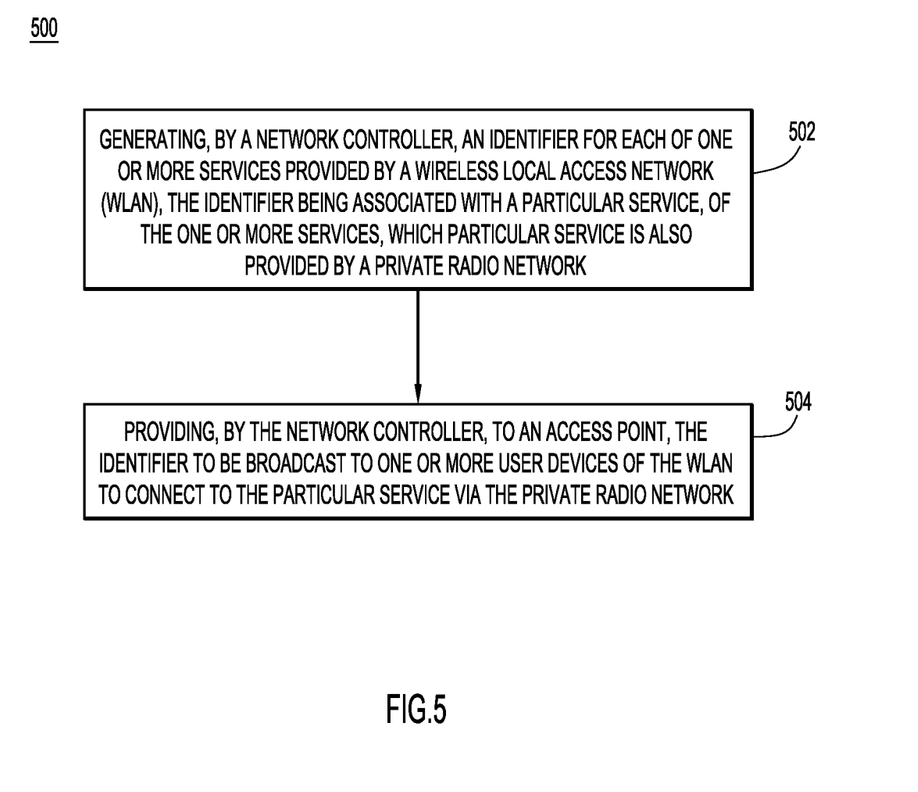
FIG. 5 is a flowchart illustrating a method of indicating an availability of the same service on another radio access network, according to an example embodiment.

FIG. 5 is a flowchart illustrating a method 500 of indicating an availability of the same service on another radio access system/network, according to an example embodiment. The method 500 is performed by a network controller, such as network controller 106 described above with reference to FIG. 1. At 502, the network controller generates an identifier for each of one or more services provided by a wireless local access network (WLAN). The identifier is associated with a particular service, of the one or more services. The particular service is also provided by a private radio network. At 504, the network controller provides, to an access point, the identifier to be broadcast to one or more user devices of the WLAN to connect to the particular service via the private radio network.

According to one or more example embodiments, the private radio network is a private long term evolution (LTE) network. The WLAN is a Wi-Fi network and the access point provides access to the Wi-Fi network to the one or more user devices.

According to one or more example embodiments, the method further includes the network controller storing the identifier such that the identifier is associated with a service set identifier (SSID) of the particular service provided in the WLAN and with an access point name (APN) identifying the particular service provided in the private radio network.

According to one or more example embodiments, the identifier is further associated with at least one policy of the particular service.

According to one or more example embodiments, the identifier is further associated with at least one data plane policy of the particular service provided in the WLAN and virtual network layer 2 and layer 3 identifiers.

According to one or more example embodiments, the particular service is one or more of an Internet service or a Voice over Internet Protocol (VoIP) service. The WLAN is a Wi-Fi network and the private radio network is a Citizens Broadband Radio Service (CBRS) network.

According to one or more example embodiments, the identifier is a service token having a predetermined length and is associated with the particular service having same set of one or more data plane policies in the WLAN and in the private radio network.

According to one or more example embodiments, the same set of one or more data plane policies includes at least one of a security group tag associated with a user device from among the one or more user devices or a security group access control list.

According to one or more example embodiments, the identifier is associated with a service set identifier (SSID) which identifies the particular service in the WLAN and is further associated with a public land mobile network (PLMN) network identifier (NID) access point name (APN) which identifies the particular service in the private radio network.

According to one or more example embodiments, the private radio network is a Citizens Broadband Radio Service (CBRS) network and the identifier is a combination of a shared home network identifier (SHNI), the NID, and the APN.

According to one or more example embodiments, the method further includes the network controller storing the identifier that includes a combination of values identifying the particular service in the private radio network; and wherein the network controller providing to the access point of the WLAN the identifier to be broadcasted to the one or more user devices.

Figure 6:
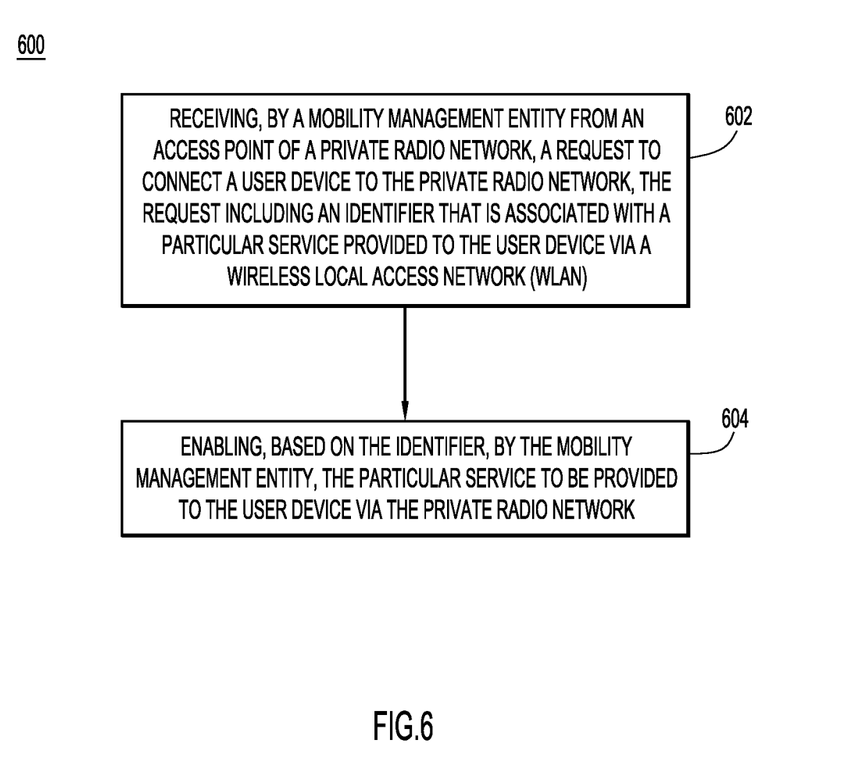
FIG. 6 is a flowchart illustrating a method of enabling the same service on another radio access network, according to an example embodiment.

FIG. 6 is a flowchart illustrating a method 600 of enabling the same service on another radio access system/network, according to an example embodiment. The method 600 is performed by a mobility management entity, such as the IWK 120 described above with reference to FIG. 1 and/or the MME 120A described above with reference to FIGS. 3A-4B.

At 602, the mobility management entity receives from an access point of a private radio network, a request to connect a user device to the private radio network. The request includes an identifier that is associated with a particular service provided to the user device via a wireless local access network (WLAN). At 604, the mobility management entity enables, based on the identifier, the particular service to be provided to the user device via the private radio network.

According to one or more example embodiment, the enabling the particular service to be provided via the private radio network may include configuring the particular service to be provided in the private radio network with a same segmentation and one or more policies of the particular service provided in the WLAN network.

According to one or more example embodiments, the method may further include searching, by the mobility management entity, for the identifier in a mapping table to obtain a corresponding service set identifier (SSID) which identifies attributes of the particular service provided in the WLAN and based on the corresponding SSID, provisioning the particular service to include the same attributes in the private radio network.

In still another embodiment, a network controller (an apparatus) is provided that includes a memory, a network interface configured to enable network communications, and a processor. The processor is configured to generate an identifier for each of one or more services provided by a wireless local access network (WLAN). The identifier is associated with a particular service, of the one or more services. The particular service is also provided by a private radio network. The processor is furthered configured to control the network interface to provide to an access point the identifier to be broadcast to one or more user devices of the WLAN to connect to the particular service via the private radio network.

According to one or more example embodiments, the private radio network is a private long term evolution (LTE) network. The WLAN is a Wi-Fi network and the access point provides access to the Wi-Fi network to the one or more user devices.

According to one or more example embodiments, the processor is further configured to control the memory to store the identifier such that the identifier is associated with a service set identifier (SSID) of the particular service provided in the WLAN and with an access point name (APN) identifying the particular service provided in the private radio network.

According to one or more example embodiments, the identifier is a service token having a predetermined length and is associated with the particular service having same set of one or more data plane policies in the WLAN and in the private radio network.

According to one or more example embodiments, the identifier is associated with a service set identifier (SSID) which identifies the particular service in the WLAN and is further associated with a public land mobile network (PLMN) network identifier (NID) access point name (APN) which identifies the particular service in the private radio network.

According to one or more example embodiments, the processor is further configured to control the network interface to receive from another access point of the private radio network, a request to connect a user device among the one or more user devices to the private radio network. The request includes the identifier. The processor is further configured to enable, based on the identifier, the particular service to be provided via the private radio network.

In yet another embodiment, one or more non-transitory computer readable storage media encoded with instructions are provided. When the media is executed by a processor, they cause the processor to generate an identifier for each of one or more services provided by a wireless local access network (WLAN) where the identifier is associated with a particular service, of the one or more services. The particular service is also provided by a private radio network. They further cause the processor to provide, to an access point, the identifier to be broadcast to one or more user devices of the WLAN to connect to the particular service via the private radio network.

Figure 7:
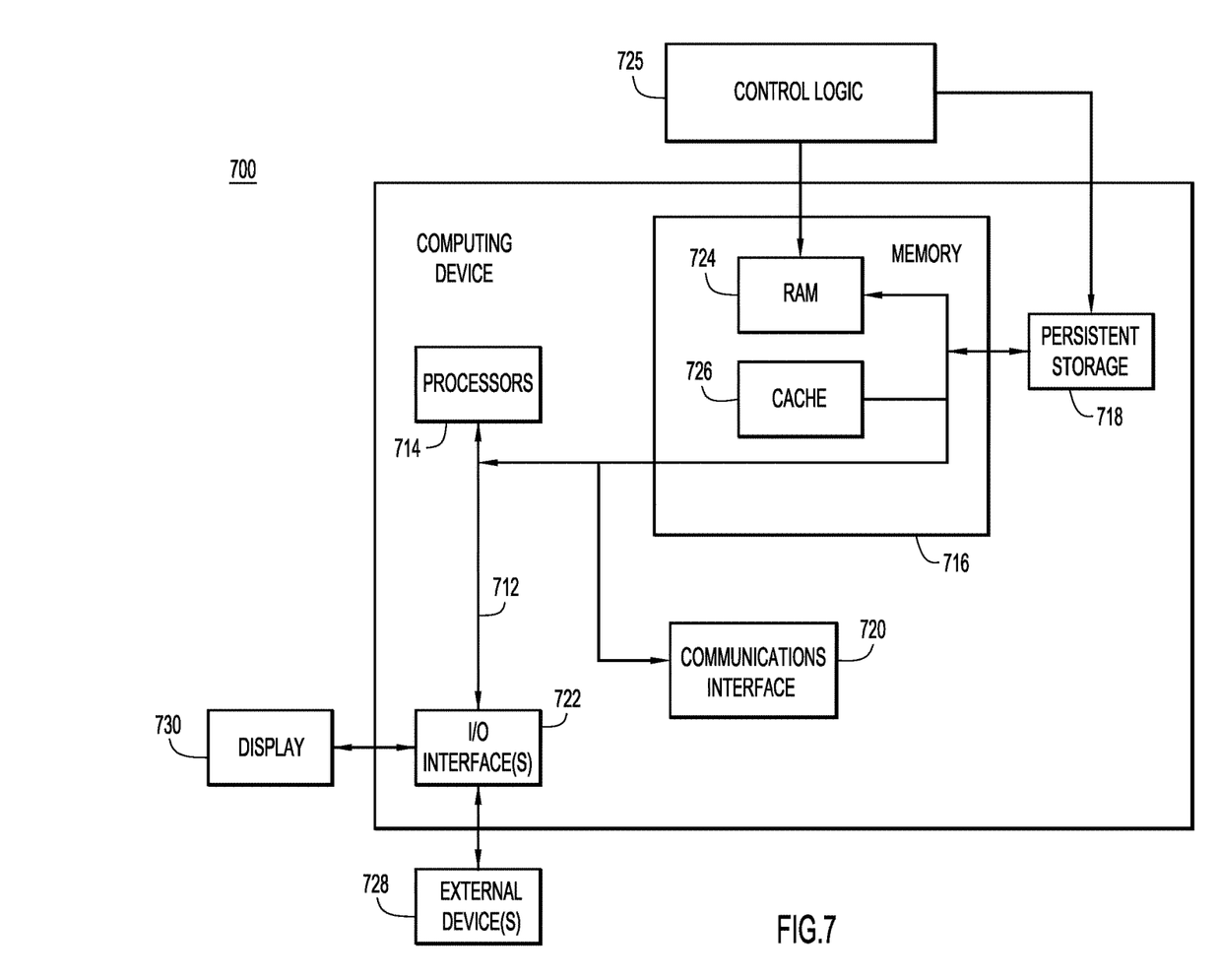
FIG. 7 is a hardware block diagram of a computing device configured to map the service provided by the Wi-Fi network to the same service provided by the CBRS network and configured to enable the same service on another radio access network, according to various example embodiments.

FIG. 7 is a hardware block diagram of a computing device 700 configured to perform the functions of a network controller 106 referred to herein in connection with FIGS. 1 and 5 and the functions of a mobility management entity (MME) referred to herein in connection with FIGS. 3, 4, and 6, according to various example embodiments. The functions include mapping the service provided by the Wi-Fi network to the same service provided by the CBRS network such that the user device may switch to the CBRS network for the same services based on the mapping, according to an example embodiment. The functions further include enabling, based on the mapping, to provide in the CBRS network a particular service, which is provided to the user device in the Wi-Fi network. It should be appreciated that FIG. 7 provides only an illustration of various embodiments and does not imply any limitations with regard to the environments in which different embodiments may be implemented. Many modifications to the depicted environment may be made.

As depicted, the computing device 700 includes a bus 712, which provides communications between computer processor(s) 714, a memory 716, a persistent storage 718, communications interface 720, and input/output (I/O) interface(s) 722. The bus 712 can be implemented with any architecture designed for passing data and/or control information between processors (such as microprocessors, communications and network processors, etc.), system memory, peripheral devices, and any other hardware components within a system. For example, the bus 712 can be implemented with one or more buses.

The memory 716 and persistent storage 718 are computer readable storage media. In the depicted embodiment, the memory 716 includes a random access memory (RAM) 724 and a cache (cache memory) 726. In general, the memory 716 can include any suitable volatile or non-volatile computer readable storage media that stores instructions for the control logic 725.

When the computing device 700 is a network controller, the control logic 725 is mapping and same service availability notification software that includes instructions for a notification of the same service available on a different access network and instructions for mapping mechanisms. That is, the control logic 725 includes instructions for generating an identifier for each of one or more services provided by the WLAN, where the identifier is associated with a particular service, of the one or more services, which particular service is also provided by a private radio network and for providing to an access point, the identifier to be broadcast to one or more user devices of the WLAN to connect to the particular service via the private radio network.

When the computing device 700 is the MME, the control logic 725 includes enabling the same particular service software that includes instructions to identify a particular service provided to a user device in the WLAN and to enable, based on the identifier, the same service via the private radio network. That is, the control logic 725 includes instructions for receiving from an access point of the private radio network, a request to connect a user device to the private radio network, where the request includes an identifier associated with a particular services provided to the user device via the WLAN and enabling, based on the identifier, the particular service to be provided to the user device via the private radio network.

The control logic 725 may be software stored in the memory 716 or the persistent storage 718 for execution by the processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by the persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

The communications interface 720, in these examples, provides for communications with other data processing systems or devices. In these examples, communications interface 720 includes one or more network interface cards. Communications interface 720 may provide communications through the use of either or both physical (wired) and wireless communications links.

The I/O interface(s) 722 allows for input and output of data with other devices that may be connected to the computing device 700. For example, the I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. The display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing system employed by the present embodiments may be implemented by any personal or other type of computer or processing system (e.g., desktop, laptop, personal data assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, wireless access network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
generating, by a network controller, an identifier for each of one or more services provided by a wireless local access network (WLAN), the identifier is a service token that maps a particular service, of the one or more services provided by the WLAN, with the same particular service provided by a private radio network; and
providing, by the network controller, to an access point, the identifier to be broadcast to one or more user devices of the WLAN to connect to the particular service via the private radio network.

2. The method of claim 1, wherein:
the private radio network is a private long term evolution (LTE) network,
the WLAN is a Wi-Fi network, and
the access point provides access to the Wi-Fi network to the one or more user devices.

3. The method of claim 1, further comprising:
storing, by the network controller, the identifier such that the identifier is associated with a service set identifier (SSID) of the particular service provided in the WLAN and with an access point name (APN) identifying the particular service provided in the private radio network.

4. The method of claim 3, wherein the identifier is further associated with at least one policy of the particular service.

5. The method of claim 3, wherein the identifier is further associated with at least one data plane policy of the particular service provided in the WLAN and virtual network layer 2 and layer 3 identifiers.

6. The method of claim 5, wherein the particular service is one or more of an Internet service or a Voice over Internet Protocol (VoIP) service and wherein the WLAN is a Wi-Fi network and the private radio network is a Citizens Broadband Radio Service (CBRS) network.

7. The method of claim 1, wherein the service token has a predetermined length and is associated with the particular service having a same set of one or more data plane policies in the WLAN and in the private radio network.

8. The method of claim 7, wherein the same set of one or more data plane policies includes at least one of a security group tag associated with a user device from among the one or more user devices or a security group access control list.

9. The method of claim 1, wherein the identifier is associated with a service set identifier (SSID) which identifies the particular service in the WLAN and is further associated with a public land mobile network (PLMN) network identifier (NID) access point name (APN) which identifies the particular service in the private radio network.

10. The method of claim 9, wherein the private radio network is a Citizens Broadband Radio Service (CBRS) network.

11. An apparatus comprising:
a memory;
a network interface configured to enable network communications; and
a processor, wherein the processor is configured to:
generate an identifier for each of one or more services provided by a wireless local access network (WLAN), the identifier is a service token that maps a particular service, of the one or more services provided by the WLAN, with the same particular service provided by a private radio network; and
control the network interface to provide to an access point the identifier to be broadcast to one or more user devices of the WLAN to connect to the particular service via the private radio network.

12. The apparatus of claim 11, wherein:
the private radio network is a private long term evolution (LTE) network,
the WLAN is a Wi-Fi network, and
the access point provides access to the Wi-Fi network to the one or more user devices.

13. The apparatus of claim 11, wherein the processor is further configured to control the memory to store the identifier such that the identifier is associated with a service set identifier (SSID) of the particular service provided in the WLAN and with an access point name (APN) identifying the particular service provided in the private radio network.

14. The apparatus of claim 11, wherein the service token has a predetermined length and is associated with the particular service having same set of one or more data plane policies in the WLAN and in the private radio network.

15. The apparatus of claim 11, wherein the identifier is associated with a service set identifier (SSID) which identifies the particular service in the WLAN and is further associated with a public land mobile network (PLMN) network identifier (NID) access point name (APN) which identifies the particular service in the private radio network.

16. The apparatus of claim 11, wherein the processor is further configured to control the network interface to receive from another access point of the private radio network, a request to connect a user device among the one or more user devices to the private radio network, the request including the identifier and to enable, based on the identifier, the particular service to be provided via the private radio network.

17. A non-transitory computer readable medium encoded with software comprising computer executable instructions operable to perform operations comprising:
generating an identifier for each of one or more services provided by a wireless local access network (WLAN), the identifier is a service token that maps a particular service, of the one or more services, with the same particular service provided by a private radio network; and
providing, to an access point, the identifier to be broadcast to one or more user devices of the WLAN to connect to the particular service via the private radio network.

18. The non-transitory computer readable medium of claim 17, wherein the operations further include:
storing the identifier such that the identifier is associated with a service set identifier (SSID) of the particular service provided in the WLAN and with an access point name (APN) identifying the particular service provided in the private radio network.

19. The non-transitory computer readable medium of claim 17, wherein the operations further include:
storing the service token that has a predetermined length and is associated with the particular service having a same set of one or more data plane policies in the WLAN and in the private radio network.

20. The non-transitory computer readable medium of claim 17, wherein:
 the private radio network is a private long term evolution (LTE) network,
 the WLAN is a Wi-Fi® network, and
 the access point provides access to the Wi-Fi network to the one or more user devices.

\* \* \* \* \*